United States Patent Office 2,860,733
Patented Nov. 18, 1958

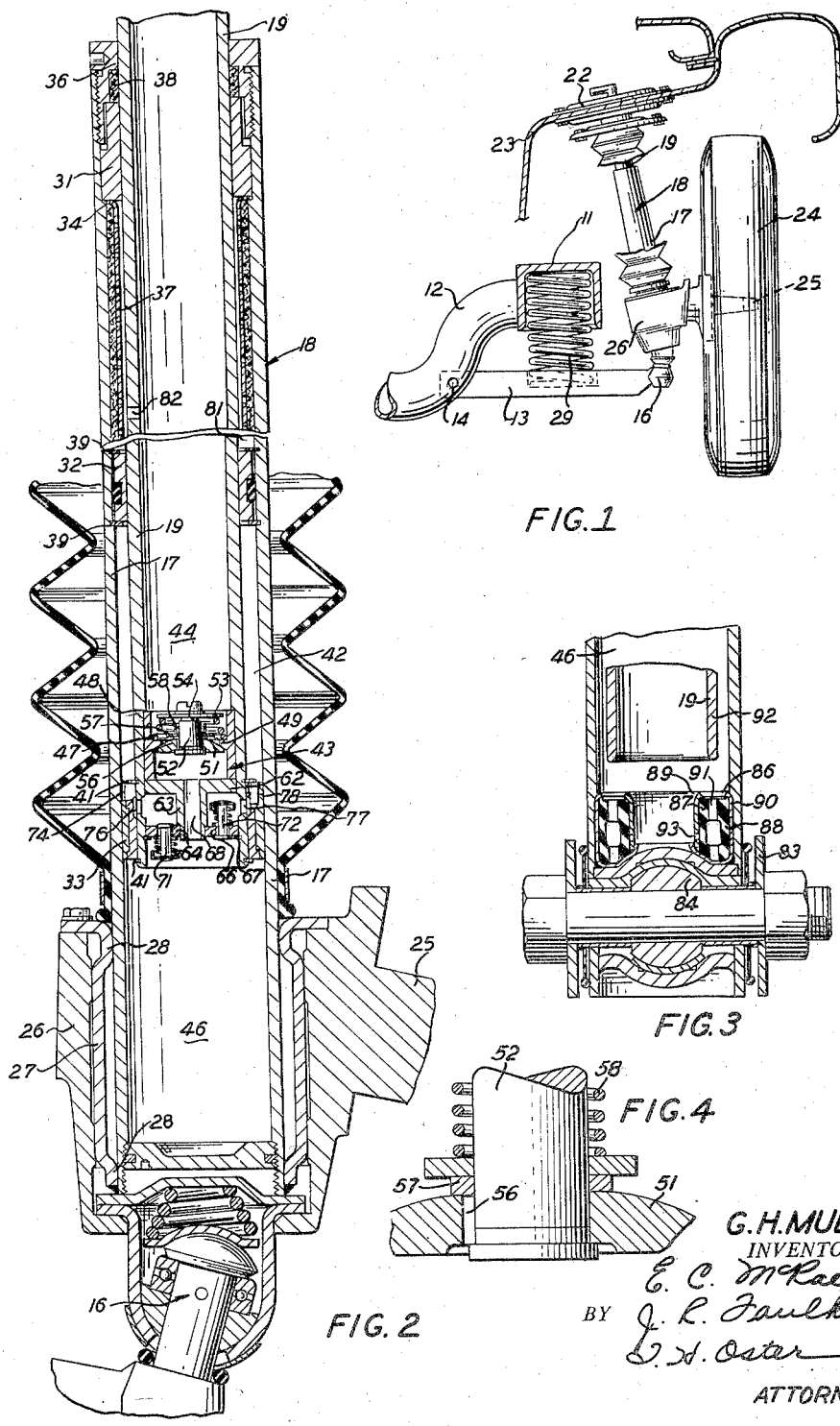

2,860,733

SHOCK ABSORBER

George H. Muller, Northville, Mich., assignor to Ford Motor Company, Dearborn, Mich., a corporation of Delaware Application March 7, 1956, Serial No. 570,044

3 Claims. (Cl. 188—88)

This invention relates generally to shock absorbers, and particularly to tubular type hydraulic shock absorbers for motor vehicles.

An object of the present invention is to provide a shock absorber for a motor vehicle formed of a pair of concentric tubular members connected to the sprung and unsprung structures of the motor vehicle and requiring a minimum of parts to provide the necessary control in both jounce and rebound movements.

Another object of the present invention is to provide a shock absorber for a motor vehicle independent wheel suspension in which the shock absorber performs not only its normal dampening functions in jounce and rebound but also serves as a telescopic control member assisting the suspension in supporting and guiding the road wheel during its rising and falling movements relative to the sprung structure of the vehicle. The shock absorber of the present invention relates to such a combined tubular type hydraulic shock absorber and telescopic control member which is so constructed as to provide resistance to the bending stresses induced in the unit during operation, and which contains a minimum of parts to achieve a lightweight construction decreasing the unsprung weight to a minimum. With this unit the quantity of hydraulic fluid displaced is relatively large and greater uniformity in control is obtained during successive operation of the unit.

Other objects and advantages of this invention will be made more apparent as this description proceeds, particularly when considered in connection with the accompanying drawings, wherein:

Figure 1 is a front elevational view of the front wheel suspension of a motor vehicle incorporating the present invention.

Figure 2 is an enlarged vertical cross sectional view through the shock absorber and telescopic control unit shown in Figure 1.

Figure 3 is an enlarged cross sectional view of a modification.

Figure 4 is an enlarged cross section of a part of Figure 1.

Referring now to the drawings, the reference character 11 indicates a side frame rail of a motor vehicle. A transversely extending tubular cross frame member 12 is welded to the side frame rail 11 and pivotally supports a wishbone type suspension arm 13 for pivotal movement about a generally longitudinally extending axis 14. At its outer end the suspension arm 13 is connected by means of a ball joint 16 to the outer tube 17 of a combined hydraulic shock absorber and telescopic control unit 18. Telescopically received within the outer tube 17 is an inner tube 19. The upper end of the inner tube 19 is connected by means of a flexible mounting 22 to a body panel 23, which may be part of a unitary frame and body structure or which may be a body portion of a conventional detachable frame construction.

The front road wheel 24 is conventionally rotatably mounted upon a wheel spindle 25. The wheel spindle 25 is formed with an integral cylindrical hub portion 26 sleeved over the outer tube 17 above the ball joint 16. An intermediate sleeve 27 is positioned between the hub 26 of the wheel spindle and the outer tube 17, being welded at its lower end to the tube and bolted at its upper end to the spindle hub. The sleeve 27 is formed with upper and lower annular ribs 28 to cushion the mounting and prevent distortion of the tube 17. A coil spring 29 is mounted between the side frame rail 11 and the suspension arm 13.

Referring now particularly to Figure 2, the inner and outer tubes 19 and 17 are arranged concentric with each other and are provided with upper, intermediate and lower annular bearing members 31, 32, and 33 respectively to accommodate telescopic movement. These bearings may be formed of a suitable babbitt material. The upper bearing 31 is held in place against a shoulder 34 formed in the outer tube 17 by means of an end cap 36. A felt wick 37 is carried by the outer tube 17 beneath the bearing 31, and a wiping seal 38 is located above the bearing 31 in the end cap 36.

The intermediate bearing 32 is located between snap rings 39 carried by the outer tube 17. Since it can float radially between the snap rings it does not form a bearing for telescopic movement between the tubes but acts as an oil restriction under certain circumstances, as will be described more in detail hereinafter.

The lower bearing 33 is carried by the inner tube 19, being held in place by means of a pair of snap rings 41. The intermediate and lower bearings 32 and 33 respectively define an annular chamber 42 between the inner and outer tubes 19 and 17 respectively, the annular chamber being of variable size depending upon jounce and rebound action.

A valve unit 43 is carried by the inner tube 19 adjacent its lower end and serves as a divider forming a reservoir chamber 44 above the valve unit and a high pressure fluid chamber 46 below the unit. The unit is formed of several members including an annular adaptor 47 seated against a shoulder 48 formed in the inner tube 19. The adaptor 47 has a radially inwardly projecting annular rib 49 forming a seat for a replenishing valve 51 mounted upon a valve stem 52. A coil spring 53 is positioned between the rib 49 and a washer 54 carried at the opposite end of the valve stem and serves to normally maintain the replenishing valve 51 in seating engagement with the rib 49. The valve may of course be opened to admit the flow of replenishing fluid from the reservoir chamber 44 above the valve to the high pressure fluid chamber 46 beneath the valve unit.

A restricted passageway 56 through the valve 51 is controlled by a main compression valve 57 urged by a coil spring 58 into seating engagement. The main compression valve controls the flow of fluid from the high pressure fluid chamber 46 beneath the valve unit to the reservoir 44 above the valve unit.

The lower section of the valve unit 43 has an upper flange 62 seated against the annular adaptor 47 and a central hub 63 formed with a shoulder 64 receiving an annular disc 66. A snap ring 67 holds the assembled sections of the valve unit in place within the inner tube 19.

The hub portion 63 of the lower section of the valve is formed with a central passageway 68 establishing communication between the high pressure fluid chamber 46 beneath the valve unit and the replenishing valve 51 and main compression valve 57. Carried by the annular disc 66 at opposite sides thereof are a rebound valve 72 and a secondary compresion valve 71 controlling pasageways through the disc.

The rebound valve 72 controls the flow of fluid from the annular chamber 42 through a port 78 in the bearing member 33 and a port 77 in the inner tube 19 to the high pressure fluid chamber 46, while the secondary compression valve 71 controls the flow of fluid from the high presure fluid chamber 46 through a port 76 in the inner tube 19 and a port 74 in the lower bearing 33 to the annular chamber 42.

Jounce Control

During jounce travel the outer tube 17 and the road wheel carried thereby move upwardly, compressing the fluid in the high pressure fluid chamber 46 beneath the valve unit 43 and forcing fluid through the secondary compression valve 71 into the annular chamber 42 between the inner and outer tubes. A portion of the fluid also flows from the high pressure chamber 46 through the main compression valve 57 into the reservoir chamber 44. The differential of flow between the two paths is dependent upon the orifice diameters and the spring constants in the valve assemblies, with the valving being arranged to favor fluid flow through the secondary compression valve 71 to assure perfect replenishing of the annular chamber 42 whose volume is increasing during jounce.

Rebound control

During rebound travel the outer tube 17 and the road wheel carried thereby move downwardly, compressing the fluid in the annular chamber 42 between the inner and outer tubes and forcing this fluid past the rebound valve 72 into the high pressure chamber 46 beneath the valve unit. The replenishing valve 51 also opens and allows flow of fluid from the reservoir chamber 44 to balance the loss differential existing by reason of the differential area of the chambers. The replenishing valve is lightly loaded to open rapidly and completely fill the high pressure chamber 46 to prevent cavitation on the next jounce stroke. To assist in the replenishing action, the reservoir chamber 44 is vented to the atmosphere at the top. During this rebound movement the resulting pressure in the annular chamber 44 may force leakage fluid past the intermediate bearing 32 into the annular chamber 81 above the bearing 32. An accumulation of oil under low pressure in the chamber 81 will flow through the orifice 82 into the reservoir chamber 44. Oil under low pressure in the chamber 81 will be reconveyed through the wick 37 to the upper bearing 31 to assure its lubrication.

Referring now to the modification shown in Figure 3, the suspension arm 83 is connected by means of a pin type ball joint 84 to the outer tube 17 of the telescopic control unit 18. Directly above the pin type ball joint 84 is a hydraulic cutoff unit 86 operable under extreme jounce conditions to provide means to cushion and finally stop the relative movement between the inner and outer tubes. The unit 86 comprises inner and outer annular rubber rings 87 and 88 mounted respectively on annular inner and outer retaining rings 89 and 90. The resilient rings 87 and 88 are spaced to provide an annular chamber 91 in alignment with the lower end 92 of the inner tube 19 beneath the valve unit. During extreme jounce travel the lower end 92 of the inner tube 19 thus enters the annular chamber 92 in the hydraulic cutoff unit, trapping an annular column of fluid in the unit. This fluid is forced through an orifice 93 in the inner rubber ring 87 and the inner retaining ring 89 into the chamber 46. It will be noted that annular grooves are formed in the central portions of the rubber rings 87 and 88 to provide an intermediate chamber therein communicating with the orifice 93. As the lower end of the inner tube 19 passes the orifice 93 the remaining oil in the lower portion of the chamber 92 between the rubber rings is trapped to complete the stopping of the travel of the inner tube.

It will be understood that the invention is not to be limited to the exact construction shown and described, but that various changes and modifications may be made without departing from the spirit and scope of the invention, as defined in the appended claims.

What is claimed is:

1. In a hydraulic shock absorber for a motor vehicle having sprung and unsprung members, an inner tube connected to one of said members, an outer tube telescopically arranged with respect to said inner tube and connected to the other of said members, a pair of axially spaced annular bearings between said tubes, one of said bearings being carried by one of said tubes and the other by the other of said tubes to define with said tubes a variable displacement annular fluid chamber, a dividing part carried by said inner tube forming a reservoir chamber within said inner tube on one side of said part and a pressure chamber within said outer tube on the opposite side of said part, said part comprising a valve body having an axial passageway therethrough, oppositely acting compression and replenishing valves controlling the flow of fluid through said passageway in each direction, a pair of ports in the wall of said inner tube adjacent said valve body, passageways in said valve body establishing communication between said ports and said pressure chamber, and compression and rebound valves carried by said valve body controlling said last named passageways.

2. A hydraulic shock absorber for a motor vehicle having sprung and unsprung members, comprising a tubular member extending generally vertically and connected near its lower end to said unsprung member, a second tubular member arranged concentrically within said first tubular member and extending beyond the upper end thereof and connected to said sprung member, axially spaced bearing means between said tubular members and defining therewith an annular chamber varying in size as said unsprung member rises and falls relative to said sprung member, a valve support carried by said second tubular member adjacent the lower end thereof to form a fluid reservoir chamber within said second tubular member thereabove, a closure for the lower end of said first tubular member to form a fluid pressure chamber in said first tubular member beneath said valve support, passage means in said valve support establishing communication between said reservoir and pressure chambers, said second tubular member having ports therethrough communicating with said annular chamber, passage means in said valve support establishing communication between said pressure chamber and said ports, a valve carried by said valve support permitting the flow of fluid from said pressure chamber to one of said ports, and a second valve carried by said valve support permitting the flow of fluid from the other of said ports to said pressure chamber.

3. In a hydraulic shock absorber for a motor vehicle having sprung and unsprung members, a pair of concentric tubular members of different diameters connected to said sprung and unsprung members respectively, said inner tubular member having a part forming a high pressure fluid chamber at one side thereof and a reservoir chamber at the other side thereof, the end of said inner tubular member extending beyond said part, and a hydraulic cushion device mounted in the end portion of said outer tubular member, said device having an annular vertically extending chamber therein adapted to slideably receive the projecting end of said inner tubular member to trap fluid in the device and cushion relative movement between said tubular members under extreme jounce conditions, said hydraulic cushion device having inner and outer resilient annular portions laterally spaced from each other to form an annular cavity therebetween corresponding in radial location and dimension to the projecting end of said inner tubular member to receive the latter under extreme jounce conditions, and one of said resilient annular portions in said device having an orifice formed therein intermediate its upper and lower portions to permit restricted flow of fluid from the annular cavity between said resilient portions into said outer tubular member.

References Cited in the file of this patent

UNITED STATES PATENTS

| | | |
|---|---|---|
| 2,183,003 | Becker | Dec. 12, 1939 |
| 2,458,157 | Furthouser | Jan. 4, 1949 |
| 2,760,604 | Wyeth | Aug. 28, 1956 |
| 2,768,002 | Rabe | Oct. 23, 1956 |

FOREIGN PATENTS

| | | |
|---|---|---|
| 691,477 | Great Britain | May 13, 1953 |